Sept. 24, 1957 A. N. ADDIE 2,807,135
FREE PISTON POWER PLANT WITH AFTERBURNER
Filed Aug. 22, 1955
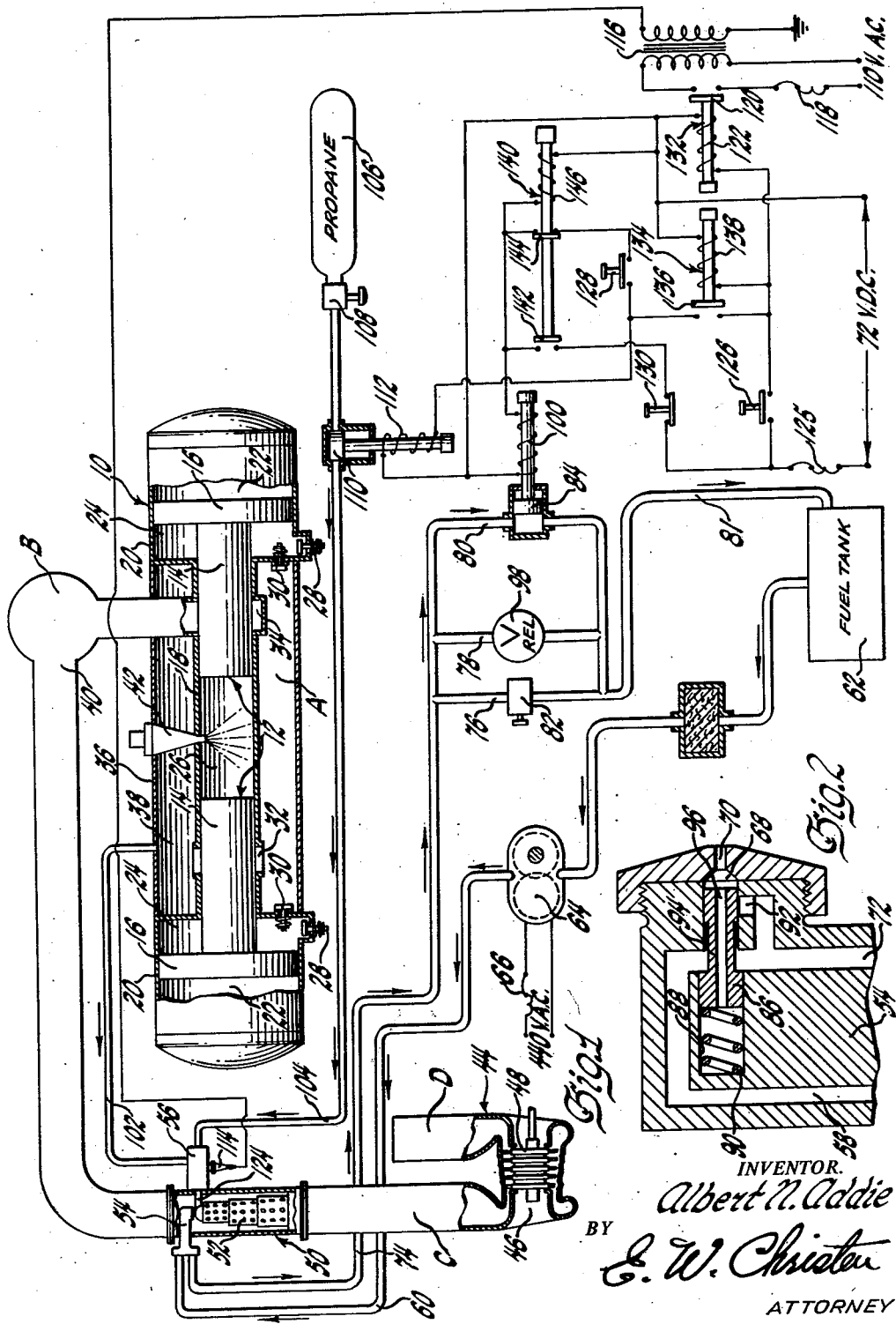
INVENTOR.
Albert N. Addie
BY
E. W. Christen
ATTORNEY

United States Patent Office 2,807,135
Patented Sept. 24, 1957

2,807,135
FREE PISTON POWER PLANT WITH AFTERBURNER

Albert N. Addie, La Grange Park, Ill., assignor to General Motors Corporation, Detroit, Mich., a corporation of Delaware Application August 22, 1955, Serial No. 529,717

11 Claims. (Cl. 60—30)

This invention relates to free piston power plants and more particularly to an afterburner arrangement for such a power plant.

A well known type of power plant includes a free piston gasifier which delivers exhaust gas at elevated temperature and pressure to a gas turbine which transforms the gas horsepower output of the gasifier to shaft horsepower so that a suitable shaft load, such as a generator or propeller, may be driven. The design criteria of a conventional free piston gasifier and gas turbine is such that the gasifier exhaust is rich in unburned air and that the gasifier exhaust temperature is below the permissible maximum inlet gas temperature of the turbine. It is feasible, therefore, to provide an afterburner between the gasifier and the turbine to combust the unburned air and thereby increase the output of the power plant. Afterburning tends to reduce the net efficiency of the power plant and should generally be used only for power augmentation during high load conditions. Although the desirability of providing a free piston power plant with an afterburner is apparent, many obstacles must be overcome to provide an operative and satisfactory installation. The afterburner must have a suitable control for starting and shutdown during gasifier and turbine operation and include a suitable cooling and ignition system to permit satisfactory operation in the high temperature gasifier exhaust. Free piston gasifiers generally operate on inexpensive residual fuel oils and the afterburner is subject to carbon build-up, especially during non-afterburning operation, unless properly designed.

An object of the invention is to provide a free piston power plant with a suitable afterburner arrangement, and especially an arrangement suitable for intermittent operation.

Further objects and advantages of the present invention will be apparent from the following description, reference being had to the accompanying drawings, wherein a preferred form of the present invention is clearly shown.

In the drawings:

Figure 1 is a partially broken away schematic of a free piston power plant including the afterburner arrangement of the invention; and Figure 2 is an enlarged partial section of the afterburner fuel nozzle of Figure 1.

Referring now to the drawings, a conventional free piston gasifier 10 includes a pair of opposed pistons 12 which have reduced portions 14 and enlarged portions 16 reciprocable in cylinders 18 and 20. The piston portions 16 form air bounce chambers 22 and compressor chambers 24 with the cylinders 20, and the piston portions 14 form a diesel chamber 26 with the cylinder 18. The compressor chambers 24 are provided with intake and exhaust valves 28 and 30 and the diesel chamber 26 is provided with intake and exhaust ports 32 and 34. A casing 36 provides a scavenge air chamber 38 between the compressor and diesel chambers, and a conduit 40 provides an exhaust for the diesel chamber. A fuel injector 42 injects fuel into the diesel chamber at approximately the end of inner stroke of the piston 14 and a suitable synchronizing mechanism (not shown) maintains the pistons in phase with each other.

The gasifier 10 comprises a pair of single-stage reciprocating air compressors which supercharge a uniflow scavenged two-stroke diesel that supplies exhaust gas at elevated temperature and pressure to a conventional axial flow multi-stage gas turbine 44 which includes a casing 46 and rotor 48, the turbine serving to transform the gas horsepower output of the gasifier to mechanical horsepower to drive a load.

The invention is concerned with augmenting the gas energy at the turbine inlet and to this end an afterburner 50 is located in the conduit 40 between the gasifier 10 and the turbine 44. The afterburner 50 includes a perforated, continuous flow combustion cylinder 52, a fuel injection nozzle 54 and a torch igniter 56 and is adapted to burn liquid fuel in the gasifier exhaust when desired.

The actual temperature and pressure conditions of a free piston power plant as shown are not fixed because the gasifier compression ratio can be varied but a representative condition of operation follows for the locations A, B, C and D during afterburning as an aid in understanding the invention.

| Location | Lbs./sq. in. (gage) | ° Fahrenheit |
|---|---|---|
| A (scavenge chamber) | 55 | 400 |
| B (gasifier exhaust) | 45 | 840 |
| C (afterburner exhaust) | 43 | 1,200 |
| D (turbine exhaust) | 0 | 750 |

With an exhaust gas flow of 8.15 lbs./second under the foregoing condition of operation, the afterburner will raise the gas horsepower of the power plant from 1200 to 1500 thus affording considerable power augmentation.

As previously noted, the invention is primarily concerned with adapting the afterburner for satisfactory intermittent operation during the continuous operation of the remainder of the power plant. Fuel is circulated through the afterburner fuel injection nozzle 54 throughout the operation of the power plant for self-lubrication and cooling purposes, and herein lies an important feature of the invention for the nozzle is subject to seizure and carbon build-up if fuel circulation does not occur during non-afterburning operation of the power plant. The fuel nozzle 54 includes an inlet passage 58 that receives a continuous supply of fuel under pressure by way of conduit 60 from a fuel tank 62. A pump 64 is operated from a suitable electrical potential, as shown, under the control of a circuit breaker 66 whenever the power plant is in operation to provide continuous fuel flow to the nozzle.

The fuel nozzle 54 is adapted to either spray liquid fuel in atomized form into the interior of the combustion chamber 52 by way of the swirl chamber 68 and spray orifice 70 or to return the fuel to the fuel tank 62 by way of a nozzle outlet passage 72, fuel conduits 74, 76, 78, 80 and 81. The fuel flow path through the fuel nozzle 54 is made dependent upon the back pressure in the discharge passage 72, and the back pressure is adjustable by a manually operable throttle valve 82 in the conduit 76 and an automatically operable bypass valve 84 in the conduit 80.

A differential piston valve 86 is reciprocably received in a bore 88 in the fuel nozzle and is urged by a spring 90 of predetermined resilience to close a port 92 that affords communication between the discharge passage 72 and the swirl chamber 68. The necked portion 94 of the piston valve 86 places the inlet and outlet passages 58 and 72 in communication with each other at all times.

A vent passage 96 places the spring side of the valve 86 in communication with the swirl chamber 68 so that the valve will compress the spring 90 and open the port 92 to discharge fuel into the combustion chamber 52 whenever the differential pressure between the discharge passage 72 and the combustion chamber reaches a predetermined value. The arrangement is preferably such that the fuel nozzle 54 discharges into the combustion chamber 52 at about 40 lbs./sq. in. differential; that is, at about 85 lbs./sq. in. gage with the power plant operating at the aforenoted representative condition.

A normally closed relief valve 98 is located in the conduit 78 and is set to open at approximately 400 lbs./sq. in. gage. The bypass valve 84 in the conduit 80 is a normally open valve and is arranged to close on energization of a coil 100 during afterburner operation. The manually operated throttle valve 82 has an open position or low flow resistance setting of such value as to cause that desired back pressure in the passage 72 which opens the nozzle port 92 on the closure of the bypass valve 84. The throttle valve may be closed from the open position and thereby adjusted to higher flow resistance values to increase the nozzle discharge pressure and, consequently, the fuel flow through the nozzle for various conditions of afterburner operation, it being desirable in some instances to increase the nozzle discharge pressure to approximately 400 lbs./sq. in. gage. A heat exchanger may be located in the conduit 81 to cool the return fuel from the nozzle, if necessary. However, the fuel tank 62 is generally of such size and capacity as to serve as a heat exchanger and thereby maintain the fuel at a reasonable temperature during recirculation.

The fuel oils for the afterburner are generally of such grade that they will not ignite without assistance even though the high temperature gasifier exhaust contains sufficient unburned oxygen to maintain combustion, and the torch igniter 56 provides an initial igniting means for the afterburner fuel. The torch igniter 56 comprises a combustion chamber which is continually supplied with pressurized air from the gasifier scavenge chamber 38 by way of a conduit 102 and with readily ignitable pressurized fuel, preferably gaseous, by way of a conduit 104. The ignition fuel supply may comprise a commercial propane storage cylinder 106 connected to the conduit 104 by a manual pressure regulating valve 108 and by an automatically operated, normally closed fuel valve 110 which is opened by energization of a coil 112.

A spark plug 114 provides ignition for the propane and air mixture and is connected to a suitable source of electrical potential through a transformer 116, a circuit breaker 118 and a normally open relay switch 120 which may be closed by energization of a coil 122. The flame in the torch igniter cylinder 56 is directed by a pipe 124 to the interior of the afterburner combustion chamber 52 adjacent the fuel spray of the nozzle 54 to ignite the fuel and institute afterburner combustion. An important feature of the invention resides in supplying the torch igniter 56 with gasifier scavenge air whenever the gasifier is operative to maintain the temperature of the igniter at reasonable levels, this being possible as the scavenge air is at a higher pressure and lower temperature than the gasifier or afterburner exhaust.

The afterburner is operated by an electrical control which includes a suitable direct current supply, a circuit breaker 125, a normally open push button start switch 126, a normally open push button run switch 128, a normally closed push button stop switch 130, a spark relay 132 which includes the normally open switch 120 closed by energization of the coil 122, a time delay relay 134 which includes a normally open switch 136 closed by energization of a coil 138, an afterburner fuel supply relay 140 which includes a normally open switch 142 and a normally closed switch 144 operated by energization of a coil 146, the normally open fuel bypass valve 84 closed by energization of the coil 100 and the normally closed igniter fuel valve 110 opened by energization of the coil 112.

The afterburner may be operated in the following manner whenever the gasifier is operative.

1. The circuit breakers 118 and 124 are closed.
2. The start switch 126 is closed and held closed. This energizes the spark relay 132 and provides high voltage to the spark plug 114. The time delay relay 134 is also energized and the switch 136 closes after a few seconds delay. On closure of the switch 136 the igniter fuel valve 110 is opened by energization of the coil 112 allowing the propane to flow to the torch igniter 56 and combust therein with the air supplied through the conduit 102. A pilot flame from the torch igniter 56 is now established in the afterburner combustion chamber 52.
3. The run switch 128 is closed and held closed energizing the afterburner fuel supply relay 140 to close the switch 142 and thereby close the afterburner fuel bypass valve 84 by energization of the coil 100. Closure of the afterburner fuel bypass valve 84 raises the back pressure in the fuel return conduit 74 and thereby causes fuel to be injected into the afterburner. The fuel supply relay switch 142 also establishes a holding circuit through the coil 146 to keep the relay energized as the switch 144 is opened.
4. The start and run switches are released to de-energize the coils 112, 122 and 138 and cut off the torch igniter. The afterburner fuel throttle valve 82 is adjusted, if necessary, to regulate fuel delivery to the afterburner.
5. Afterburner operation is discontinued by opening the stop switch 130 which de-energizes the afterburner fuel supply relay 140 to open the switch 142, to de-energize the coil 100 and to close the switch 144. The fuel bypass valve 84 opens on de-energization of the coil 100 and reduces the back pressure in the nozzle passage 72 whereupon the nozzle spring 90 actuates the piston valve 86 to shut off fuel flow to the afterburner.
6. If the afterburner fails to start due to a misfire, the stop switch 130 may be opened and the starting procedure repeated after a few minutes interval to purge unburned fuel from the afterburner.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. In combination, an engine adapted for afterburner operation, a fuel system, an exhaust conduit connected to the engine, a nozzle in the exhaust conduit having inlet and outlet passages connected to the fuel system and a discharge port opening into the exhaust conduit, means connecting the inlet passage to the discharge port for discharging fuel from the discharge port to effect afterburning operation of the engine, said means being operable to connect the inlet and outlet passages and to disconnect the discharge port from the inlet passage to effect non-afterburning operation of the engine and to cool the nozzle from the exhaust heat of the engine during the non-afterburning operation thereof.

2. In combination, a free piston engine adapted for afterburner operation, a fuel sysem having a supply line and a return line, an exhaust conduit connected to the engine, a nozzle subject to the heat of the exhaust conduit and having a passage connecting the supply line with the return line and having a discharge port leading from the passage and opening into the exhaust conduit, and a valve in the nozzle operable to open and close the nozzle discharge port in response to fluid pressure changes in the fuel system to determine afterburner operation of the engine, the valve being ineffective to close the nozzle passage so that fuel flow therethrough will cool the nozzle during non-afterburning operation of the engine.

3. Apparatus in accordance with claim 2 including a spring in the nozzle operable to bias the nozzle valve toward closed position in opposition to the fluid pressure in the nozzle passage connecting the fuel system supply and return lines.

4. Apparatus in accordance with claim 3 including valve means in the fuel system return line and operable to control the fluid pressure in the nozzle passage.

5. In combination, a free piston engine adapted for afterburner operation, a scavenge air chamber connected to the engine, an exhaust conduit connected to the engine, a fuel system having a nozzle for injecting fuel in the exhaust conduit for afterburner operation of the engine, and means for igniting the fuel from the nozzle including a combustion chamber connected to the exhaust conduit and operable to direct a flame at the fuel injected by the nozzle, a conduit connecting the scavenge air chamber to the combustion chamber to supply pressurized air thereto, means for supplying fuel to the combustion chamber, and means for igniting the fuel-air mixture in the combustion chamber to produce the igniting flame for the nozzle.

6. In combination, a free piston engine adapted for afterburner operation, a scavenge air chamber connected to the engine, an exhaust conduit connected to the engine, a fuel system having a nozzle for injecting fuel in the exhaust conduit for afterburner operation of the engine and for terminating such fuel injection for non-afterburning operation of the engine, a torch igniter connected to the exhaust conduit and communicating with the interior thereof and operable to direct an igniting flame at the fuel injected by the nozzle, and a conduit connecting the scavenge air chamber to the torch igniter to supply pressurized air thereto during afterburning and non-afterburning operation of the engine to cool the torch igniter from the exhaust heat of the engine and to block the entry into the torch igniter of fluid from the exhaust conduit.

7. In combination, a free piston engine adapted for afterburner operation, a scavenge air chamber connected to the engine, an exhaust conduit connected to the engine, a fuel system including a nozzle in the exhaust conduit, the nozzle having inlet and outlet passages connected to the fuel system through which passages fuel flow is maintained during non-afterburning operation of the engine to cool the nozzle against the exhaust heat of the engine and having a valve controlled discharge port operably connecting the inlet passage to the exhaust conduit to determine afterburning operation of the engine, a torch igniter connected to the exhaust conduit and communicating with the interior thereof and operable to direct an igniting flame at the fuel injected by the nozzle, and a conduit connecting the scavenge air chamber to the torch igniter to supply pressurized air thereto during afterburning and non-afterburning operation of the engine to cool the torch igniter from the exhaust heat of the engine and to block the entry into the torch igniter of fluid from the exhaust conduit.

8. In combination, a supercharged internal combustion engine adapted for afterburner operation, a scavenge air chamber connected to the engine, an exhaust conduit connected to the engine, a fuel system including a nozzle in the exhaust conduit, the nozzle having inlet and outlet passages connected to the fuel system through which passages fuel flow is maintained during non-afterburning operation of the engine to cool the nozzle against the exhaust heat of the engine and having a valve controlled discharge port operably connecting the inlet passage to the exhaust conduit to determine afterburning operation of the engine, a torch igniter connected to the exhaust conduit and communicating with the interior thereof and operable to direct an igniting flame at the fuel injected by the nozzle, and a conduit connecting the scavenge air chamber to the torch igniter to supply pressurized air thereto during afterburning and non-afterburning operation of the engine to cool the torch igniter from the exhaust heat of the engine and to block the entry of fluid into the torch igniter from the exhaust conduit.

9. In combination, an internal combustion engine adapted for afterburner operation, a fuel system having high and low pressure areas, an exhaust conduit connected to the engine, a nozzle in the exhaust conduit having inlet and outlet passages connected to the high and low pressure areas, respectively, of the fuel system and having a discharge port opening into the exhaust conduit, means connecting the inlet passage to the discharge port for discharging fuel from the discharge port to effect afterburning operation of the engine, said means being operable to connect the inlet and outlet passages and to disconnect the discharge port from the inlet passage to effect non-afterburning operation of the engine and to cool the nozzle from the exhaust heat of the engine.

10. In combination, an internal combustion engine adapted for afterburner operation, a fuel system having a supply line and a return line, an exhaust conduit connected to the engine, a nozzle subject to the heat of the exhaust conduit and having a passage connecting the supply line with the return line and having a discharge port leading from the passage and opening into the exhaust conduit, and a valve in the nozzle operable to open and close the nozzle discharge port in response to fluid pressure changes in the fuel system to determine afterburner operation of the engine, the valve being ineffective to close the nozzle passage so that fuel flow therethrough will cool the nozzle during non-afterburning operation of the engine.

11. In combination, an internal combustion engine adapted for afterburner operation, an exhaust conduit connected to the engine, a fuel system including a nozzle in the exhaust conduit, the nozzle having inlet and outlet passages connected to the fuel system through which passages fuel flow is maintained during non-afterburning operation of the engine to cool the nozzle against the exhaust heat of the engine and having a discharge port operably connecting the inlet passage to the exhaust conduit, and a valve in the nozzle operable to open and close the discharge port in response to pressure changes in the fuel system to determine afterburner operation of the engine.

References Cited in the file of this patent

UNITED STATES PATENTS

| 2,439,473 | Kalitinsky | Apr. 13, 1948 |
| 2,583,651 | Horning | Jan. 29, 1952 |
| 2,620,621 | Nettel | Dec. 9, 1952 |

FOREIGN PATENTS

| 931,807 | Germany | Aug. 18, 1955 |